March 7, 1967 T. H. JENSEN 3,308,270
METHOD OF AND APPARATUS FOR CONTROLLING
HEATING ELEMENT TEMPERATURE
Filed Jan. 27, 1964
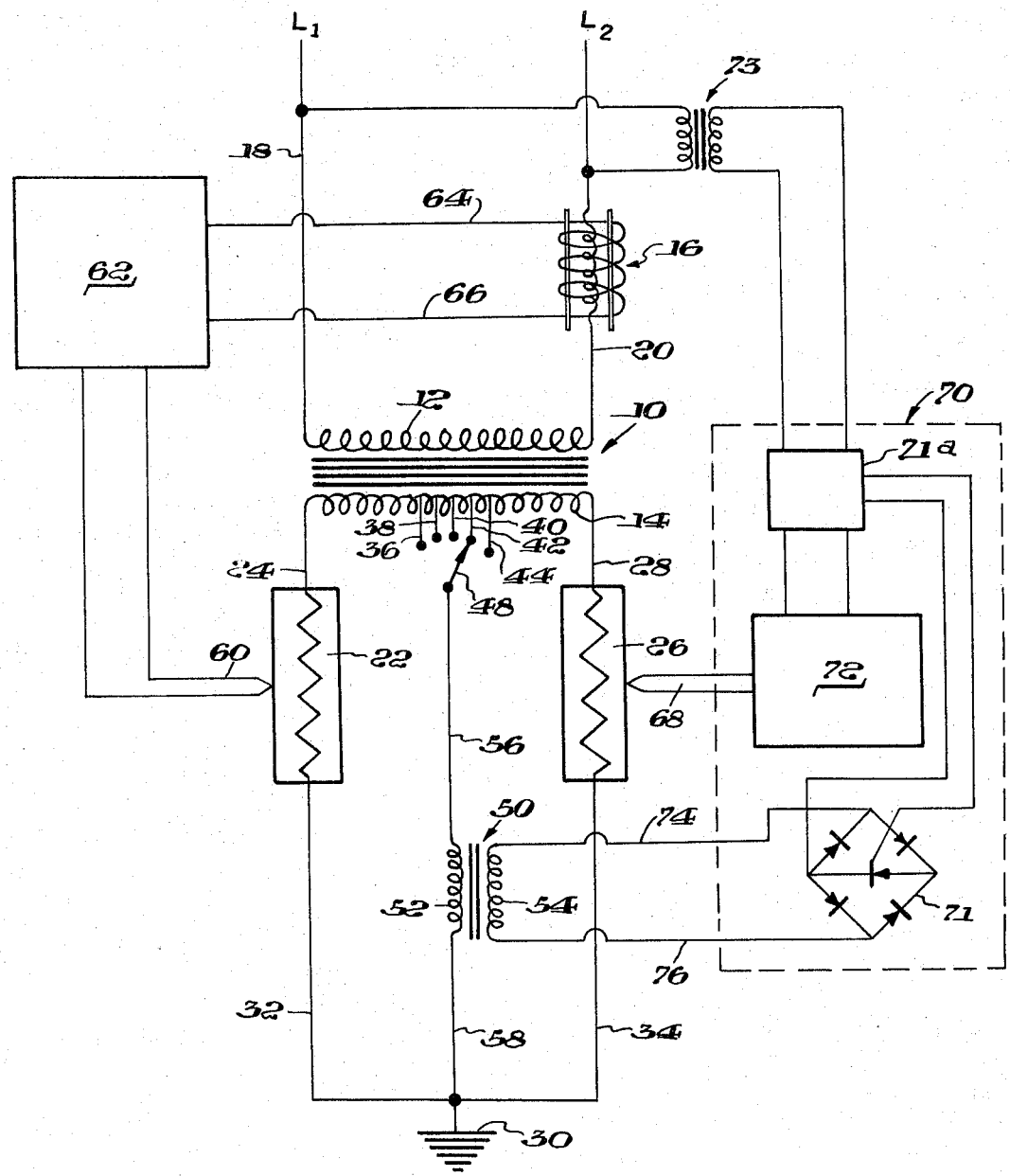
INVENTOR.
THOMAS H. JENSEN.
BY Oscar L. Spencer
his ATTORNEY.

United States Patent Office 3,308,270
Patented Mar. 7, 1967

3,308,270
METHOD OF AND APPARATUS FOR CONTROLLING HEATING ELEMENT TEMPERATURE
Thomas H. Jensen, Oakmont, Pa., assignor to Pittsburgh Plate Glass Company, Pittsburgh, Pa., a corporation of Pennsylvania
Filed Jan. 27, 1964, Ser. No. 340,432
5 Claims. (Cl. 219—497)

This invention relates to the method of and apparatus for controlling heating element temperature and, more particularly, to a method and apparatus for controlling the temperature of feeders or bushings through which molten glass passes to be formed into strands of fiber glass.

In the manufacture and production of fiber glass, molten glass is allowed to pass, by gravity, through small orifices formed in a metal feeder or bushing. The feeder or bushing is formed of platinum or other material capable of withstanding high temperatures. Each of these feeders or bushings is heated to maintain the glass in a molten state as it passes through the orifices of the bushings to form a glass filament or fiber. Each of the bushings that receives the molten glass and forms it into filaments or fibers contains from 200 to 1,200 individual orifices to form the fibers.

In conventional fiber glass manufacturing processes, each individual bushing is heated electrically from a source of alternating current electricity and is maintained at a predetermined temperature to permit proper formation of the filaments. The bushing is powered by the secondary coil of a power transformer. The bushing temperature is sensed by a temperature responsive element, such as a thermocouple, and a temperature indication is transmitted from the thermocouple to a temperature controller. The power supplied to the bushing is controlled by the use of a saturable core reactor, which is placed in series electrical circuitry with the primary coil of the power transformer, and which is regulated by the temperature controller.

The temperature controller transmits direct current to the saturable core reactor so that the impedance of the saturable core reactor varies with varying temperatures on the bushing being controlled. This variable impedance causes a variation of power in the primary coil of the power transformer and, accordingly, causes a variation of power in the secondary coil of the power transformer and the bushing itself.

The bushing or feeder which permits the molten glass to pass therethrough to form fiber glass filaments is an electrical heating element that is powered by alternating current. So long as the alternating current power source is connected directly to the bushing or electrical heating element, the foregoing conventional power arrangement for the bushing or electrical heating element is utilized to control the temperature of the bushing.

The present invention is directed to the operation of two bushings or electrical heating elements from a single power source so that each of the electrical heating elements may be maintained at predetermined temperatures.

In the present invention, two electrical heating elements are operated from the secondary coil of a power transformer and the bushings are each maintained at the optimum predetermined temperatures. In the production of fiber glass, it was found desirable to operate two bushings in close proximity to each other so that the winding of the filaments was facilitated. When the two bushings were so operated, space limitations, as well as the expense of equipment duplications, prohibited providing each of the bushings with a complete separate power transformer and temperature controller. Accordingly, the present invention provides for the use of a single power transformer, slightly modified, together with some auxiliary equipment to accurately control the temperatures of two electrical heating elements or bushings that are utilized in close proximity to each other.

At first it was attempted to merely place the two bushings or electrical heating elements in a series circuit with the secondary coil of the power transformer. However, by so doing, it was discovered that small differences in manufacture of the two bushings, as well as the transients introduced in interrupting the operation of one or the other of the bushings during the manufacturing process, prevented the accurate maintenance of each of the two bushings at the predetermined temperatures. Accordingly, the system of the present invention was developed for maintaining two bushings of similar construction at constant predetermined temperatures in the manufacturing of fiber glass filaments.

With the foregoing considerations in mind, it is an object of the present invention to provide a method for maintaining two electrical heating elements powered from a common source of electrical energy at constant, independent, predetermined temperatures.

Another object of the present invention is to provide apparatus for maintaining two electrical heating elements powered by the same source of electrical energy at constant, independent, predetermined temperatures.

Another object of the present invention is to provide a control system by which one electrical heating element can be controlled by controlling the common power source of both electrical heating elements and the second electrical heating element can be controlled by regulating the amount of current passing therethrough.

Another object of the present invention is to provide a system whereby two electrical heating elements may be powered from the same secondary coil of a power transformer and, at the same time, may be maintained at constant predetermined temperatures.

These and other objects of this invention will become apparent as this description proceeds in conjunction with the accompanying drawing.

The drawing is a schematic illustration of the electrical system of the present invention.

Referring to the drawing, a power transformer 10 having a primary coil 12 and a secondary coil 14 is connected to an alternating current power source $L_1$, $L_2$, in series circuitry with a saturable core reactor 16 by power lines 18 and 20. The power source $L_1$–$L_2$, is 440 volt A.C., 60 cycle.

A first bushing or electrical heating element 22 is electrically connected to one end of the secondary coil 14 by an electrical conductor 24. A second bushing or electrical heating element 26 is electrically connected to the other end of secondary coil 14 by electrical conductor 28. Each of the bushings or electrical heating elements 22 and 26 are connected to a common ground 30 by conductors 32 and 34, respectively.

The secondary coil 14 of the power transformer 10 has a plurality of voltage taps 36, 38, 40, 42 and 44, constructed near the center of the secondary coil 14. A conducting wiper member 48 may be alternately positioned on any one of the voltage taps 36, 38, 40, 42 or 44.

A secondary control transformer 50 having a primary coil 52 and a secondary coil 54 is positioned so that the primary coil 52 is electrically connected to the wiper member 48 by an electrical conductor 56. The opposite end of the primary coil 52 is connected to the common ground 30 by electrical conductor 58.

A temperature responsive element 60, illustrated as a thermocouple, is connected to electrical heating element 22 to transmit a signal indicating the temperature of electrical heating element 22 to a temperature controller 62. The temperature controller 62 is a commercially available item and its exact construction forms no part of the present invention. The temperature controller 62 is designed to receive the temperature signal from the temperature responsive element 60 and, in response to the temperature signal, transmit direct current over conductors 64 and 66 to the saturable core reactor 16.

The temperature responsive element 60 supplies the temperature signal to temperature controller 62. The controller 62, in turn, supplies direct current to the saturable core reactor 16 to modify the impedance offered by the reactor in the primary coil circuit of power transformer 10. When the temperature of the electrical heating element 22 begins to rise above a value preselected by adjustment of the temperature controller 62, the direct current supplied from the controller 62 to the saturable core reactor 16 is reduced, thereby increasing the impedance offered by the reactor 16 and diminishing the current flow in the secondary coil of power transformer 10. If the temperature of the electrical heating element 22 tends to drop below the preselected value, the controller 62 supplies additional direct current to the saturable core reactor 16, thereby reducing the reactor impedance and increasing the current flow in the secondary coil 14 of power transformer 10. The electrical heating element 22 is thereby maintained at a relatively fixed temperature regardless of the rate of withdrawal of the fiber glass fibers through the bushing or electrical heating element 22.

In conventional installations, not utilizing the present invention, the power transformer 10 has only the single heating element 22 connected across its secondary coil 14. The temperature of the single element is then controlled by temperature controller 62 by use of the saturable reactor 16 as hereinbefore described.

The system of the present invention utilizes the conventional arrangement hereinbefore described and also utilizes the additional components to be hereinafter described in detail.

The second electrical heating element 26 has a temperature responsive element 68 shown as a thermocouple, connected thereto. The temperature responsive element 68 transmits a temperature signal to a control device generally designated by the numeral 70, which includes a full wave rectifier unit 71 and a temperature controller 72. The control device 70 is powered through an auxiliary transformer 73 from the power source $L_1$–$L_2$.

The full wave rectifier unit 71 is controlled by a firing unit 71a and is connected to the secondary coil 54 of control transformer 50 by electrical conductors 74 and 76. In a manner similar to the temperature controller 62, the temperature controller 72 receives a temperature signal from the temperature responsive element 68 attached to electrical heating element 26, and generates gate voltage to the rectifier 71 resulting in a controlled impedance of the secondary coil 54 of control transformer 50. With the variation in impedance of the secondary coil 54 of control transformer 50, the impedance of the primary coil 52 varies in response thereto. Accordingly, by varying the impedance of primary coil 52, the amount of current by-passing the electrical heating element 26 is varied resulting in a direct variation of current through the element 26. The two heating elements 22 and 26 are constructed such that they will require differing amounts of current in order to operate at the desired temperatures. This difference in current is then the current that flows through coil 52 of secondary control transformer 50 to provide the control current required for the controller 72 to control.

*Operation*

With the electrical components as described in the foregoing portion of this specification, the bushings or electrical heating elements 22 and 26 of the present invention may be controlled to maintain them at predetermined temperatures. The temperature controller 62 is permitted to control the temperature of the electrical heating element 22 while the control device 70 is, initially, rendered inoperative. The electrical heating element 22 is then operated with temperature controller 62 maintaining the temperature of element 22 at the predetermined level. At that level, the wiper arm 48 is positioned manually to one of the taps 36, 38, 40, or 42, so that the voltage available to coil 52 is sufficient to maintain the desired temperature of element 26 irregardless of transient effect on element 26. The set point of wiper member 48 thus is manually positioned to divide the current from secondary coil 14 in a manner corresponding to the approximate current requirements of the two heating elements.

With the position of wiper member 48 so positioned manually, the difference of the two currents in elements 22 and 26 is now made available to the controller 72 through transformer 50. The temperature controller 72 responds to the temperature signal from temperature responsive element 68 to control the impedance of the secondary coil 54 of control transformer 50. This controlled impedance on coil 54 controls the impedance of primary coil 52 of transformer 50, thereby regulating the flow of current through coil 52, and thereby regulating the flow of current through the electrical heating element 26 to bring the temperature of heating element 26 to the exact desired temperature. The temperature controller 62 and control device 70 are, of course, each set to maintain the electrical heating elements 22 and 26 at the predetermined temperatures.

As the two heating elements 22 and 26 are utilized for the production of glass filaments, the transients on the two heating elements vary as the production of glass filaments through them is changed and altered. Accordingly, the temperature controller 62 will continuously vary the power available to the secondary coil 14 of transformer 10 in order to control the temperature of heating element 22. At the same time, control device 70 will vary the impedance of coil 52 on control transformer 50 so that the amount of current from the secondary coil 14 of power transformer 10 that passes through heating element 26 will vary as the requirements demand, to maintain the temperature of heating element 26 at the predetermined temperature.

The range of temperatures which can be achieved on heating element 26 is directly dependent upon the amount of voltage available to coil 52 of the control transformer. This voltage is regulated by the position of wiper arm 48 on coil 14 of transformer 10 and would increase as wiper arm 48 is moved away from center position.

*General*

The electrical system shown in the accompanying drawing and described in the foregoing specification is designed for use with a 440 A.C. power source. The positioning of wiper arm 48 should be such that the resulting voltage across coil 52 will provide sufficient control current to handle the control requirements of the particular system. In a fiber glass application this voltage should be approximately 25% of the total voltage developed across coil 14.

It should be recognized that in the system of the present invention the two controllers 62 and 70 must be somewhat different in response characteristics so as to minimize any interaction or "hunting" phenomena which could occur. There must also be sufficient difference in the current requirements of the two electrical heating elements 22 and 26 to insure that there will be a control current for the electrical heating element 26.

It has been found that with the present invention the temperature of the electrical heating elements 22 and 26 can be maintained within plus or minus ¼° F. of a predetermined set point.

According to the provisions of the patent statutes the principle, preferred construction and mode of operation of the invention have been explained, and what is considered to represent its best embodiment has been illustrated and described. It should be understood, however, that, within the scope of the appended claims, the invention may be practiced otherwise than as specifically illustrated and described.

I claim:

1. Apparatus for maintaining first and second A.C. electrical heating elements energized from the secondary coil of power transformer having a primary and a secondary coil at predetermined temperatures, said apparatus comprising:

first circuit means including a first temperature controller, a first temperature responsive element, and a saturable means, arranged to regulate said power transformer in response to temperature signals from said first A.C. electrical heating element;

said power transformer secondary coil being electrically connected at one end to one side of said first A.C. electrical heating element and at the other end to one side of said second A.C. electrical heating element;

said power transformer secondary coil having a plurality of voltage taps;

a control transformer having a primary coil and a secondary coil;

circuit means for alternately connecting one of said voltage taps to one end of said control transformer primary coil;

circuit means to connect one side of said first A.C. electrical heating element, one side of said second A.C. electrical heating element, and one end of said control transformer primary coil to a common ground;

said control transformer secondary coil being electrically connected to a second temperature controller constructed and arranged to vary the impedance on said control transformer secondary coil in response to temperature signals;

a second temperature responsive element connected to said second A.C. electrical heating element and connected to said second temperature controller to transmit temperature signals from said second A.C. electrical heating element to said second temperature controller;

said first and second temperature controllers each being set to maintain said first and second A.C. electrical heating elements at predetermined temperatures.

2. Apparatus for maintaining first and second A.C. electrical heating elements energized from the secondary coil of a power transformer having a primary and a secondary coil at predetermined temperatures, said apparatus comprising:

a saturable core reactor connected in electrical series with said transformer primary coil;

a first temperature controller constructed and arranged to impress a direct current on said saturable core reactor in response to temperature signals;

a first temperature responsive element connected to said first A.C. electrical heating element and electrically connected to said first temperature controller to transmit temperature signals from said first A.C. electrical heating element to said first temperature controller;

said power transformer secondary coil being electrically connected at one end to one side of said first A.C. electrical heating element and at the other end to one side of said second A.C. electrical heating element;

said power transformer secondary coil having a plurality of voltage taps;

a control transformer having a primary coil and a secondary coil;

circuit means for alternately connecting one of said voltage taps to one end of said control transformer primary coil;

circuit means to connect one side of said first A.C. electrical heating element, one side of said second A.C. electrical heating element, and one end of said control transformer primary coil to a common ground;

said control transformer secondary coil being electrically connected to a second temperature controller constructed and arranged to vary the impedance on said control transformer secondary coil in response to temperature signals;

a second temperature responsive element connected to said second A.C. electrical heating element and connected to said second temperature controller to transmit temperature signals from said second A.C. electrical heating element to said second temperature controller;

said first and second temperature controllers each being set to maintain said first and second A.C. electrical heating elements at said predetermined temperatures.

3. The apparatus of claim 2 wherein said first and second temperature responsive elements are thermocouples.

4. The apparatus of claim 2 wherein said second temperature controller is operated, through an auxiliary transformer, from the same source of power which operates said power transformer.

5. Apparatus for maintaining first and second A.C. electrical heating elements energized from the secondary coil of a power transformer having a primary and a secondary coil at predetermined temperatures, said apparatus comprising:

a saturable core reactor connected in electrical series with said transformer primary coil;

a first temperature controller constructed and arranged to impress direct current voltage on said saturable core reactor in response to temperature signals;

a first temperature responsive element connected to said first A.C. electrical heating element and electrically connected to said first temperature controller to transmit temperature signals from said first A.C. electrical heating element to said first temperature controller;

said power transformer secondary coil being electrically connected at one end to one side of said first A.C. electrical heating element and at the other end to one side of said second A.C. electrical heating element;

said power transformer secondary coil having a plurality of voltage taps;

a control transformer having a primary coil and a secondary coil;

circuit means for alternately connecting one of said voltage taps to one end of said control transformer primary coil;

circuit means to connect one side of said first A.C. electrical heating element, one side of said second A.C. electrical heating element, and one end of said control transformer primary coil to a common ground;

said control transformer secondary coil being electrically connected to a second temperature controller constructed and arranged to vary the impedance on said control transformer secondary coil in response to temperature signals;

said control transformer secondary coil being electrically connected to a full wave rectifier;

said full wave rectifier connected to a second controller;

an auxiliary transformer connected to the same source of power which operates said power transformer;

a firing unit connected to and powered by a secondary coil of said auxiliary transformer and electrically connected to said second controller and said full wave rectifier;

said second controller, firing unit and full wave rectifier constructed and arranged to vary the impedance of said control transformer secondary coil in response to temperature signals;

a second temperature responsive element connected to said second A.C. electrical heating element and connected to said second temperature controller to transmit temperature signals from said second A.C. electrical heating element to said second temperature controller;

said first and second temperature controllers each being set to maintain said first and second A.C. electrical heating elements at said predetermined temperatures.

References Cited by the Examiner

UNITED STATES PATENTS

| | | | |
|---|---|---|---|
| 2,857,501 | 10/1958 | Nitsche | 219—503 |
| 3,166,246 | 1/1965 | Fielden | 219—499 |
| 3,180,974 | 4/1965 | Darling | 219—497 |
| 3,218,671 | 11/1965 | Justus et al. | 219—503 |
| 3,247,361 | 4/1966 | Woodley | 219—501 |

RICHARD M. WOOD, *Primary Examiner.*

L. H. BENDER, *Assistant Examiner.*